(12) United States Patent
Neumann

(10) Patent No.: US 10,163,346 B2
(45) Date of Patent: Dec. 25, 2018

(54) COMPUTER SYSTEM AND METHOD FOR DETERMINING STAY PERIODS OF A ROAD VEHICLE

(71) Applicant: PTV Planung Transport Verkehr AG, Karlsruhe (DE)

(72) Inventor: Olaf Neumann, Karlsruhe (DE)

(73) Assignee: PTV Planung Transport Verkehr AG, Karlsruhe (DE)

( * ) Notice: Subject to any disclaimer, the term of this patent is extended or adjusted under 35 U.S.C. 154(b) by 0 days.

(21) Appl. No.: 15/875,544

(22) Filed: Jan. 19, 2018

(65) Prior Publication Data

US 2018/0144631 A1 May 24, 2018

Related U.S. Application Data

(63) Continuation of application No. PCT/EP2016/066822, filed on Jul. 14, 2016.

(30) Foreign Application Priority Data

Jul. 20, 2015 (EP) .................................... 15177499

(51) Int. Cl.
*G01S 19/42* (2010.01)
*G08G 1/133* (2006.01)
(Continued)

(52) U.S. Cl.
CPC .............. *G08G 1/133* (2013.01); *G01C 21/20* (2013.01); *G01S 19/42* (2013.01); *G06Q 30/00* (2013.01);
(Continued)

(58) Field of Classification Search
CPC ....... G08G 1/133; G08G 1/0112; H04W 4/40; H04W 4/025; G07C 5/02; G01S 19/42
See application file for complete search history.

(56) References Cited

U.S. PATENT DOCUMENTS 9,432,944 B1 *   8/2016  Benegal ............ H04W 52/0277
2012/0214513 A1 * 8/2012  Hashimoto ......... H04W 64/006
                                                      455/456.2
(Continued)

FOREIGN PATENT DOCUMENTS

EP   1106968 A1    6/2001
WO   2008/051663 A2   5/2008

OTHER PUBLICATIONS

Huang, Kuo-Hung, and Yen-Ling Chang. "Trace Learning Path by Mobile Technologies as an Instructional Tool Using GPS and GIS in Students' Field Trip to Zoo." ICUC. 2006. (Year: 2006).*

(Continued)

*Primary Examiner* — Alan D Hutchinson
(74) *Attorney, Agent, or Firm* — Brake Hughes Bellermann LLP

(57) ABSTRACT

A computer system, method, and computer program product, for detecting a stay of a vehicle. The computer system includes an interface component configured to periodically receive location data sets (211-1 to 211-n) from one or more location sensors attached to the vehicle. The system further includes a motion detection component configured to detect a stop of the vehicle when at least two consecutive location data sets (211-1, 211-2) represent the same physical location within a tolerance range to define a stop location of the vehicle.

18 Claims, 4 Drawing Sheets

(51) Int. Cl.
*G01C 21/20* (2006.01)
*G06Q 30/00* (2012.01)
*H04W 4/00* (2018.01)
*H04W 4/40* (2018.01)
*G07C 5/02* (2006.01)
*G08G 1/01* (2006.01)
*H04W 4/02* (2018.01)

(52) U.S. Cl.
CPC ............. *G07C 5/02* (2013.01); *G08G 1/0112* (2013.01); *H04W 4/00* (2013.01); *H04W 4/025* (2013.01); *H04W 4/40* (2018.02)

(56) References Cited

U.S. PATENT DOCUMENTS

| | | | | |
|---|---|---|---|---|
| 2013/0252638 A1* | 9/2013 | Yang | ..................... | H04W 4/021 455/456.3 |
| 2014/0310366 A1* | 10/2014 | Fu | ........................... | H04L 51/04 709/206 |
| 2015/0338116 A1* | 11/2015 | Furuta | ................. | H04L 12/2818 700/276 |
| 2016/0018530 A1* | 1/2016 | Ashjaee | ................ | G01S 19/426 342/357.27 |

OTHER PUBLICATIONS

Intention to Grant for EP Application No. 15177499.9, dated Mar. 2, 2017, 7 pages.
Office Action for EP Application No. 15177499.9, dated Feb. 16, 2016, 6 pages.
International Search Report for International Application PCT/EP2016/066822, dated Aug. 23, 2016, 2 pages.

* cited by examiner

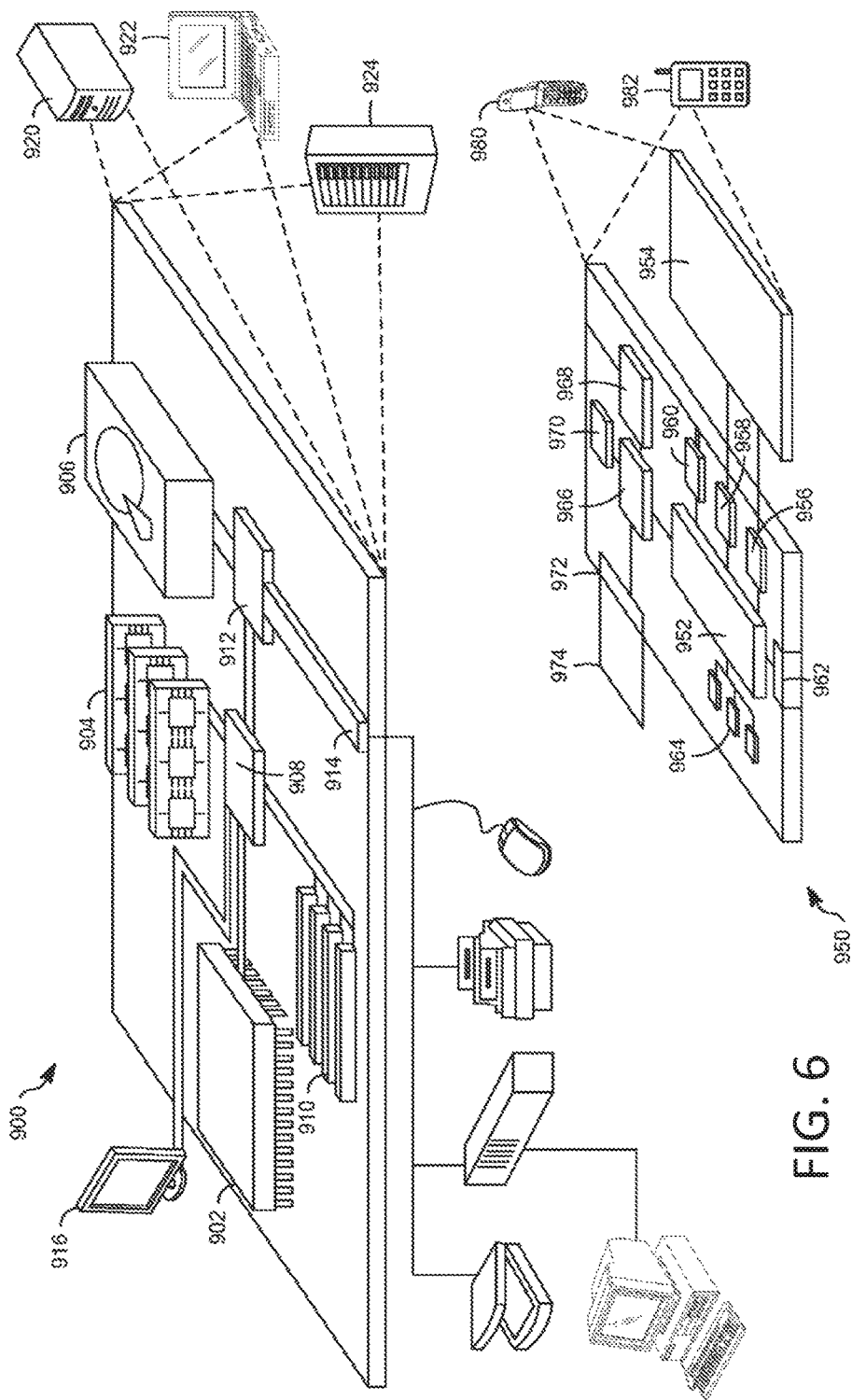

COMPUTER SYSTEM AND METHOD FOR DETERMINING STAY PERIODS OF A ROAD VEHICLE

CROSS REFERENCE TO RELATED APPLICATIONS

This application claims priority to, and is a continuation of, PCT Application No. PCT/EP2016/066822, filed on Jul. 14, 2016, entitled "COMPUTER SYSTEM AND METHOD FOR DETERMINING STAY PERIODS OF A ROAD VEHICLE," which, in turn, claims the benefit of priority based on EP Application No. 15177499.9, filed on Jul. 20, 2015, both of which are hereby incorporated by reference.

TECHNICAL FIELD

The present disclosure generally relates to systems for road vehicle navigation, and in particular to systems and methods for the determination of vehicle motion.

BACKGROUND

Some applications in the context of route planning for vehicles or vehicle navigation require accurate information about stay periods of a vehicle. In some implementations, historical average values of expected wait times may be used to update a system for tracking a vehicle. However, such wait times are generally tracked by the user. In some implementations, a user (driver) amends stay times and wanted stay times which may then be used for changing the guiding of the vehicle in a dynamic manner. Tracking stay times by a user can result in subjective estimates, for example, when the user forgets to track the stop or start times and then estimates the duration of the stay later on. Further, manual input of stay times can be subject to unauthorized manipulation. This may not be acceptable in cases where the accuracy of stay times should be tracked in an objective manner. For example, legal provisions may require exact measurement and logging of stay times in a non-modifiable way. Hence, there is a need for an improved system and method for accurately and objectively determining stay periods of a vehicle.

SUMMARY

In a first general aspect, a computer system for detecting a stay of a vehicle includes an interface component which is configured to periodically receive location data sets from one or more location sensors attached to the vehicle. Many vehicles are equipped with Global Positioning System (GPS) sensors to determine the current physical location of the vehicle. However, any other location sensor appropriate for determining the current location may be used, such as for example, sensors for WLAN signals or mobile communication cell signals where triangulation methods or similar methods can be applied. The interface component may communicate with the location sensor(s) via an appropriate network, such as for example, a CAN-Bus as used in most modern cars. However, the location sensor may also be attached to a mobile navigation system which is placed in the vehicle but not communicatively coupled with the vehicle electronics. In some cases, status data like the engine status or the rotational speed of the wheels cannot be accessed via the interface component. In such cases, the location sensor data can be used for stay detection without any further additional status information about the vehicle status.

The computer system further has a motion detection component which is configured to detect when the vehicle stops and starts again. For detecting a stop of the vehicle, the system determines when at least two consecutive location data sets represent the same physical location within a tolerance range. The at least two consecutive location data sets define a stop location of the vehicle. The tolerance range can be a predefined or dynamically determined geometric shape around the stop location. Once a stop is detected the point in time corresponding to the earliest received data set of the consecutive location data sets is determined as start of a stay period of the vehicle. A point in time corresponding to the earliest received data set of consecutive location data sets, as used hereinafter, means that the point in time is either associated with the earliest received data set or at least related to the earliest received data set. Related to the earliest received data set includes using a later received data set which has a defined offset (e.g., a given number of sampling intervals) with regards to the earliest received data set.

For detecting a restart of the vehicle, the system determines when at least two consecutive location data sets are outside the tolerance range of the stop location and the location data sets outside the tolerance range show a trend that the vehicle is moving away from the stop location. Once a restart of the vehicle is detected, the point in time corresponding to the earliest received data set of the consecutive location data sets outside the tolerance range is determined as an end of the stay period.

Therefore, the system has accurately measured the length of the vehicle's stay period (i.e., the time between the end and the start of the stay period) completely independent of any user action or input. The system may utilize automatically measured sensor data and the analysis of such data implemented stop detection and restart detection algorithms. The user or driver of the vehicle (or any other human) cannot manipulate the measured stay length.

In certain situations, the received sensor location data may be of low accuracy. For example, the location sensor may receive a GPS signal from only three satellites or may receive noisy cell tower signals. In this case the received location data may show a relatively high noise level and the received location data may be distributed around the actual stop location (e.g., in a Gaussian distribution). In one embodiment, the motion detection component of the system further includes a filter component which is configured to improve the reliability of the stay detection components by filtering out such noisy data. Once the motion detection component detects a stop of the vehicle it can filter the periodically received location data by ignoring particular location data sets received after the start of the stay period if the particular location data sets represent physical locations outside the tolerance range, and if the particular location data sets are followed by at least one further location data set within the tolerance range. In other words, if sensor data indicate locations of the vehicle outside the tolerance range (e.g., because of a low signal quality of the positioning signals) the system is able to filter out such wrong data if any one of the subsequently received location data is again within the tolerance range.

In another general aspect a system may compute the stop location as the averaged location of the at least two consecutive location data sets representing the same physical location. The tolerance range may be defined by a predefined geometric shape with the stop location at its center. The predefined shape may be dynamically selected dependent on the environment of the stop location. When computing the averaged location continuously during the stay period, that is, as long as no restart detection occurs, the center of the tolerance range may also be continuously adjusted, thus improving the accuracy of the stop location and allowing improved filtering because less location data sets will fall out of the tolerance range. The motion detection component may even dynamically adjust the size of the tolerance range by taking into account the quality of the received location sensor data. That is, in case the positioning signal quality is relatively low the size of the tolerance range may be relatively increased so that more of the received location data sets fall into the tolerance range leading to an improved averaging of the stop location.

It may occur that the system detects a restart of the vehicle because the location data outside the tolerance range indicates that the vehicle is moving away from the stop location. However, this trend may be accidental in that the location data sets outside the tolerance range may simply be noisy. In case such data sets are again followed by at least one further location data set within the tolerance range, the motion detection component may invalidate the detected restart detection. For example, the end flag for the location data set indicating the end of the stay period may be removed and the stay period is measured by the system as still ongoing. Under certain conditions, an invalidation of the restart detection may not happen. For example, if any one of the detected location data sets outside the tolerance range indicates a physical location which is so far away from the stop location that the deviation cannot be explained with the noise distribution of the positioning signal then the vehicle has likely moved away from the stop location and has returned later. Another situation where the system may prevent invalidating the restart detection is when the vehicle has moved to another stop location which is relatively close to the original stop location and the tolerance range of the later stop location overlaps with the tolerance range of the original stop location. Dependent on the noise level of the positioning signal, the system may determine that the vehicle has moved from a first to a second stop location by tracking the average stop position.

In another general aspect, the stay detection system may be communicatively coupled to a vehicle navigation system. The navigation system may include a route planning component to compute an expected arrival time of the vehicle based on a planned route, a start time and at least one planned stay period. For example, navigation systems for trucks typically allow the planning of stay periods for the truck because the truck drivers often take breaks to comply with legal requirements. The navigation system further has an interface component to receive the measured actual stay period from the stay detection system. In many situations, such as for example, just in time delivery of goods for manufacturing, it is important to continuously update the expected arrival time of the vehicle based on the actual driving performance. In such cases, it may be advantageous for the navigation system to recognize whether a detected stay period of the vehicle corresponds to a planned stay period (pause) or whether the vehicle briefly stopped for some other reason (e.g., because of a traffic jam). For this purpose, the navigation system further has an updating component to update the expected arrival time based on the current location of the vehicle, the current time, and the received actual stay period. In some implementations, updating may include charging the actual stay period up against the at least one planned stay period if the length of the actual stay period exceeds a predefined threshold length. In other words, only when a detected stay period lasts longer than a certain period which defines a minimum duration of a pause it will be taken into account for balancing the planned stay periods with the actual pauses. Otherwise, the system recognizes that the delay caused by the stop of the vehicle is to be added to the expected arrival time.

In another general aspect, a computer-implemented method is executed by the stay detection system to perform the above described functions of the system.

In another general aspect, a computer program product includes instructions that are loaded into a memory of a stay detection computing device and executed by at least one processor of the computing device to cause the processor to perform the above describe functions.

Further aspects of the present disclosure will be realized and attained by means of the elements and combinations particularly depicted in the appended claims. It is to be understood that both, the foregoing general description and the following detailed description are exemplary and explanatory only and are not restrictive of the present disclosure as described.

BRIEF DESCRIPTION OF THE DRAWINGS

FIG. 6 is a diagram that shows an example of a generic computer device and a generic mobile computer device, which may be used with the techniques described here.

DETAILED DESCRIPTION

Figure 1:
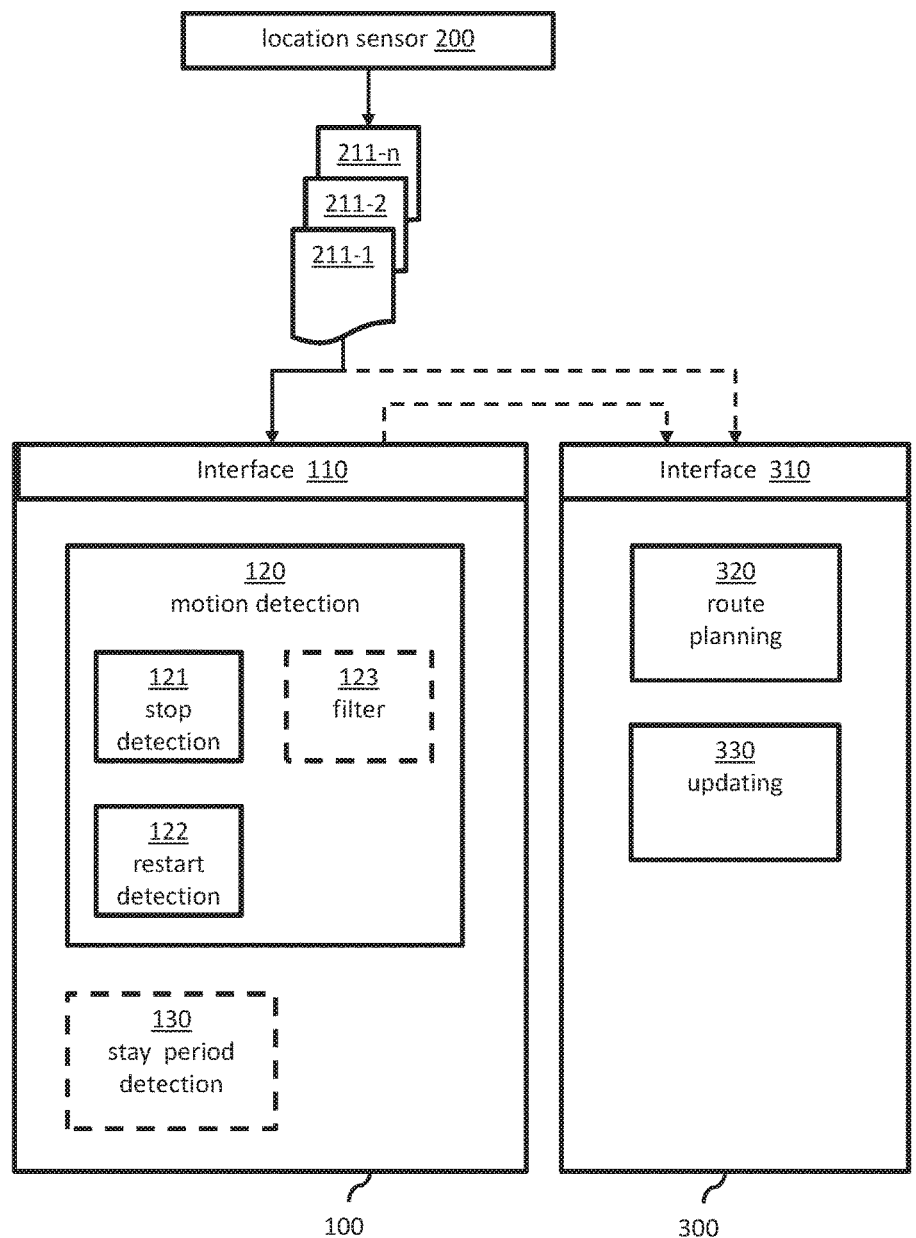
FIG. 1 is a simplified block diagram of a stay detection computer system according to one embodiment of the present disclosure, wherein the system is communicatively coupled with a navigation system and one or more location sensors.
Figure 2:
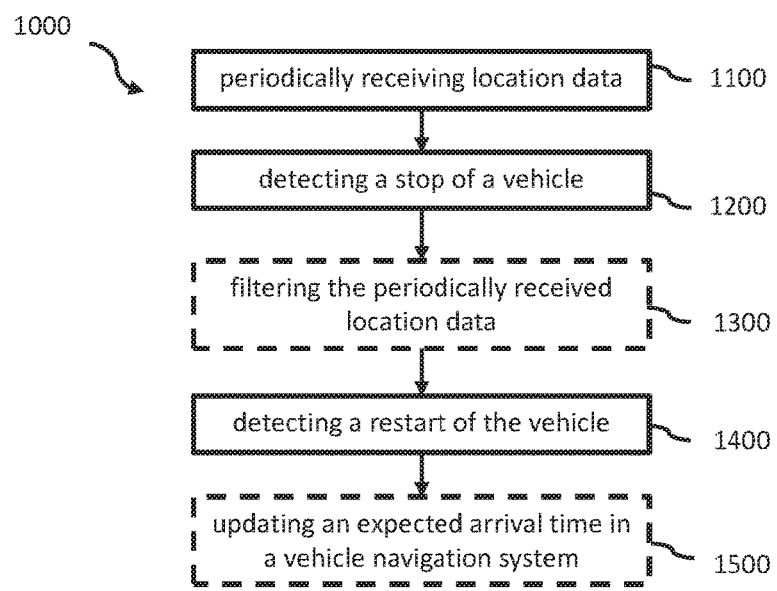
FIG. 2 is a simplified flow chart of a computer-implemented method for detecting the stay of a vehicle according to one embodiment of the present disclosure.

FIG. 1 is a simplified block diagram of a stay detection computer system 100 according to some implementations which is communicatively coupled with one or more location sensors 200 and which may further be coupled with a navigation system 300. FIG. 1 is described in the context of FIG. 2 which is a simplified flow chart of a computer-implemented method 1000 for detecting the stay of a vehicle being executed by the system 100 in operation. The reference figures relate to both, FIG. 1 and FIG. 2. Optional elements of the embodiments are illustrated by dashed lines in the figures.

The one or more location sensors can be based on any technology which is capable to determine geo-coordinates of the respective sensor. Examples of location sensor types may include, but are not limited to: Global Navigation Satellite System (GNSS) sensors (e.g., GPS sensors), Ground Based Augmentation System (GBAS) sensors, Local Area Augmentation System (LAAS) sensors, and Ground Based Regional Augmentation System (GRAS) sensors. The one or more location sensors 200 are physically attached to the vehicle so that the determined location data correspond to the location data of the vehicle. The location sensor periodically provides location data sets 211-1 to 211-n to the stay detection computer system 100 through the interface 110. In vehicles, often a CAN-Bus is used for the internal communication between hard-/and software components of the vehicle. A typical time interval between two sensor data sets (e.g., 211-1, 211-2) received 1100 by the interface 110 is in the range of one minute. However, larger or smaller frequencies or sampling rates for the location data may be used.

A motion detection component 120 of the system 100 can analyze the received location data sets to detect a stop of the vehicle and a restart of the vehicle by using respective stop and restart detection components 121, 122. The stop detection component 121 is configured to detect 1200 a stop of the vehicle 10 when at least two consecutive (i.e., consecutively received) location data sets 211-1, 211-2 represent the same physical location within a tolerance range. For example, the stop detection component 121 can compute a virtual circle with a predefined radius (or another appropriate geometric shape) to define the tolerance range around the particular physical location corresponding to the geo-coordinates of the latest received location data set. This particular physical location may be used as the center of gravity of the computed geometric shape. If the next received location data set corresponds to a physical location which is inside the tolerance range as defined by the geometric shape, the stop detection component determines a stop of the vehicle. The stop location of the vehicle may be associated with the earlier received particular physical location or it may be computed as the average location of the earlier received and the last received location data sets. The center (of gravity) of the geometric shape may be adjusted to the averaged stop location which may be updated after each received location data set within the tolerance range. The point in time corresponding to the earlier received data set 211-1 of the consecutive location data sets is then determined as start of a stay period of the vehicle. For example, the location data sets can be buffered in an appropriate data structure of a memory of the system 100 and the earlier received location data set 211-1 is flagged as start of the stay period.

The restart detection component 122 is configured to detect 1400 a restart of the vehicle when at least two consecutive location data sets are outside the tolerance range of the stop location and the location data sets outside the tolerance range show a trend that the vehicle is moving away from the stop location. In other words, location data sets detected outside the tolerance range define a vector which is pointing away from the stop location indicating that the vehicle has moved away from the stop location during at least two sampling intervals of the location sensor data. In case of detecting 1400 a restart the restart detection component 122 determines point in time corresponding to the earliest received data set of the location data sets outside the tolerance range as defining the end of the stay period. In other words, the origin of the vector is flagged as end of the stay period.

The disclosed stay detection system allows fully automated detection of stay periods of a vehicle without any user input or user interaction. Therefore, the measured stay periods are free from any subjective assessment of the driver regarding the length of a stay and can be determined with a high degree of accuracy which is determined by the sampling frequency of the location sensor data sets received by the stay detection system and the accuracy of the location information. The overall error in measuring the actual stay time of the vehicle is below two sampling intervals. That is, if an update interval of one minute is used, the error in the computation of the stay period is below two minutes. Further, the measured actual stay periods can be stored in a memory of the system which is not accessible for the driver/user. Thereby, the measured stay periods are secure against any manipulation by the driver.

In one embodiment, the motion detection component further may have a filter component 123 which further improves the data quality of the stay detection system through filtering 1300 of noisy location data. Details of the filter component 123 are disclosed in FIG. 5.

In one embodiment, the system 100 may include a stay period detection component 130. The stay period detection component simply computes the length of the stay period as the time difference between the end and the start points of the stay period and can provide the length of the stay period to external systems via the interface 110.

In one embodiment, the stay detection system 100 may be coupled to the navigation system 300. Alternatively, the stay detection system 100 can be an integral part of the navigation system 300. The navigation system 300 has a route planning component 320 configured to compute an expected arrival time of the vehicle based on a planned route, a start time and at least one planned stay period. Route planning algorithms are known by the person skilled in the art of navigation systems. Based on start and end point of the planned tour the system computes one or more alternative routes according to predefined constraints (e.g., shortest route, fastest route, economical route, etc.). The system uses information stored in maps about distance and average speed on certain parts of the route to compute the expected arrival time. The route planning component 320 further allows planning stay periods for a planned tour which are then used as input data when computing the expected arrival time. In a second mode, the route planning component can take into account actual measured stay periods when updating a planned route based on actual location and time data. Both modes can be run simultaneously.

In operation, the navigation system 300 periodically receives the current location data from the one or more location sensors 200 of the vehicle and can update the expected arrival time by taking into account the current time, the current location of the vehicle and the remaining planned route. However, for a correct update of the expected arrival time it is advantageous for the navigation system to distinguish between actual stays of the vehicle which correspond to planned stay periods versus stays which may be caused by a traffic jam or similar incidents. For this purpose, the navigation system 300 can receive the measured actual stay period from the computer system 100 through the interface component 310 (e.g., via the internal communication bus of the vehicle). The updating component 330 of the navigation system can then update 1500 the expected arrival time based on the current location of the vehicle, the current time, and the received actual stay period. Thereby, updating 1500 includes charging the actual stay period up against the at least one planned stay period if the length of the actual stay period exceeds a predefined threshold length. In other words, the updating component 330 knows the minimum time interval required for a stay period which qualifies as a pause of the driver according to the planned stay periods. Only if the measured stay period is at least as long as the minimum time interval for a pause it will be taken into account as a planned stay period (pause) and the at least one planned stay period is reduced by the actual measured stay period. In this case, there is no effect on the expected arrival time unless the remainder of the at least one planned stay period is less than the minimum time interval. In this case, the difference between the minimum time interval and the remainder is added to the expected arrival time because an actual pause will always have at least the length of the minimum time interval. However, if the actual measured stay period is larger than the remaining at least one stay period the difference amount is added to the expected arrival time. A measured actual stay period which is shorter than the minimum time interval for a pause directly affects the computation of the expected arrival time as it is automatically added to the expected arrival time by not being compensated through the planned stay period(s).

Figure 3:
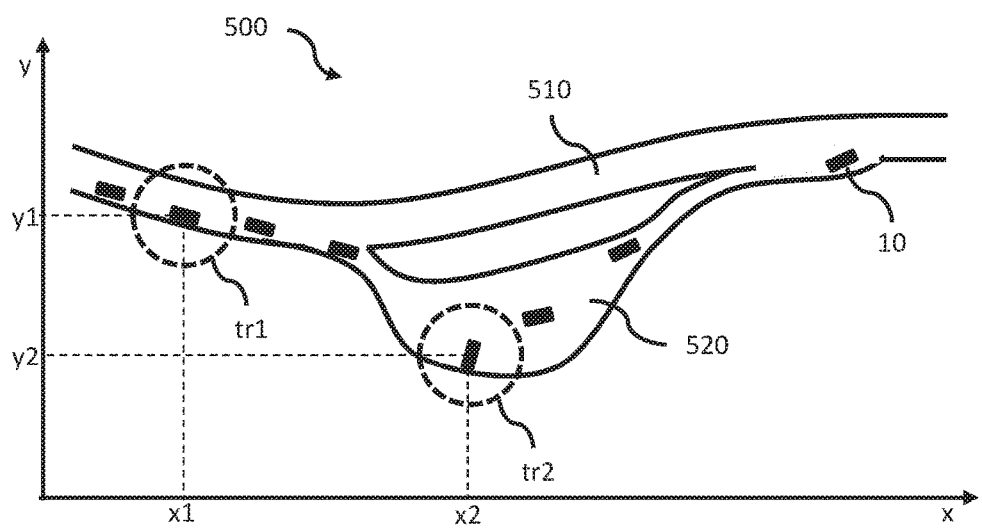
FIG. 3 is a terrain diagram illustrating the route of a vehicle with two stop locations.

FIG. 3 is a terrain diagram 500 illustrating the route of a vehicle 10 with two stop locations (x1,y1), (x2,y2). In the example, the terrain diagram 500 is simplified in that it only uses a two dimensional visualization of the terrain along the dimensions x and y represented by the x-axis and y-axis defining a coordinate system. Each point in the terrain diagram corresponds to a physical real-world location. The terrain 500 includes a section of a route 510 and a parking space (parking site) 520 which can be reached from the route.

For example, the vehicle 10 illustrated by black rectangles is driving on the route 510 from the left to the right. Each individual black rectangle in FIG. 3 corresponds to a position of the vehicle over time where location data is received. At the physical location (x1,y1) the vehicle comes to a standstill because of a traffic jam. As soon as the stay detection system of the vehicle 10 receives two consecutive sensor signals which represent the same physical location within the tolerance range tr1 the motion detection component of the stay detection system detects a stop of the vehicle.

The stop location which is determined based on the received location sensor data may deviate from the actual physical stop location of the vehicle because of a noisy positioning signal. Thereby, various positioning signal types are associated with different levels of signal accuracy regarding the position data. For example, a GPS signal is more accurate than a cell tower signal but measuring the location takes more time, consumes more energy and only works outdoors. In case the vehicle is standing underneath a roof, the GPS signal may not work at all. The cell tower signal is faster but less accurate. Another option is using wireless local area network (WLAN, Wi-Fi) signals if there are multiple WLAN routers available so that triangulation methods can be applied. WLAN based positioning is faster and more accurate than GPS and may also be used indoors (e.g., under a roof). As a conclusion, on roads in most cases the system has to cope with cell tower triangulation (relatively fast but less accurate) and/or GPS (slower but more accurate). On parking sites, also WLAN may be available as a fast and accurate alternative.

Some location sensors can provide the information about the source of the location data to the stay detection system. That is, the stay detection system knows from which kind of positioning signal the received location data sets originate. In such an embodiment, the stay detection system can dynamically adjust the size of the tolerance range dependent on the positioning signal type. For example, if WLAN signals were used by the location sensor the tolerance range can be smaller than in the case of GPS signals because the location data based on WLAN signals are more accurate (less noisy) than location data based on GPS signals. If cell tower signals are used by the sensor, the selected tolerance range advantageously is larger than in the case of GPS signals. Advantageously, the actual stop location is within the tolerance range tr2. As described earlier, multiple location data sets representing the same physical location can be averaged to determine the stop location of the vehicle and this averaged stop location may define the center (of gravity) of the tolerance range tr1, respectively. Advantageously, the shape of the tolerance range is a circle or a polygon which approximates a circle. Alternatively, other shapes, such as triangles, rectangles, squares, etc. can be used. Information about the current environment (e.g., derived from the map of a route planning or navigation system) may also be used to select an appropriate shape. For example, an elliptic shape may be selected in the current example, where the vehicle stops on the road because of a traffic jam.

Figure 4:
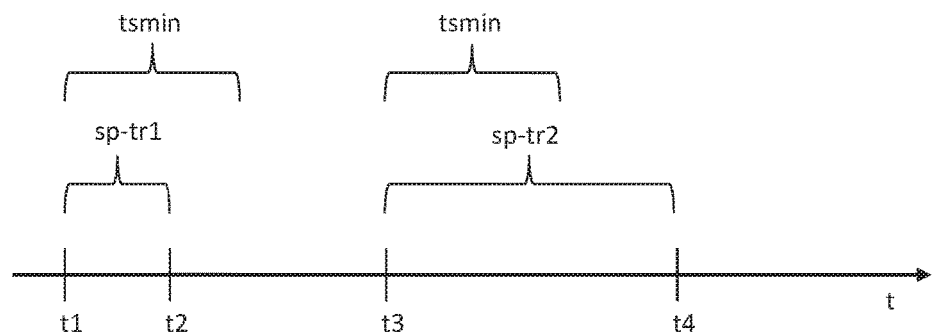
FIG. 4 illustrates stay periods of the vehicle in relation to a minimum pause interval.

As illustrated in FIG. 4, the system further determines t1 as start of a first stay period sp-tr1 by analyzing the received location data sets as described earlier. At t2, the traffic jam dissolves and the vehicle 10 continuous driving. Turning back to FIG. 3, the stay detection system detects a restart of the vehicle 10 because the two consecutive location data sets corresponding to the two locations of the vehicle following the stop location (x1,y1) are outside the tolerance range tr1 of the stop location (x1,y1) and, at the same time, show a trend that the vehicle 10 is moving away from the stop location (x1,y1). Advantageously, the time interval at which location data sets are periodically received from the location sensor is between 30 seconds and 3 minutes. This allows to measure stay periods with an error between one minute and six minutes. Larger errors may also be acceptable in particular application scenarios.

The vehicle 10 then takes the exit to the parking space 520 and arrives at a second stop location (x2,y2) for making a break. Again, the stay detection system detects a stop of the vehicle and determines the start time t3 of a second stay period sp-tr2 (cf. FIG. 4). The tolerance range tr2 used for the stop detection at the second stop location may be different from the tolerance range that was used during the traffic jam. A typical radius for a tolerance range circle can be around seventy-five meters. For example, the parking space may be equipped with a plurality of WLAN routers providing a higher accuracy regarding the positioning signal. In this case, the tolerance range tr2 may be smaller than the tolerance range tr1. When the driver finishes the break and continues to drive the stay detection system detects a restart condition of the vehicle 10 once the two consecutive vehicle positions outside the tolerance range tr2 indicate that the vehicle 10 is moving away from the second stop location (x2, y2). Finally the vehicle enters the road 510 again. The system determines t4 as the end of the second stay period sp-tr2 (cf. FIG. 4).

Based on the measured lengths (duration) of the actual stay periods sp-tr1, sp-tr2 a navigation system can then determine, how the measured stay periods should be taken into account when updating the expected arrival time of the vehicle. In the example of FIG. 4, the first stay period sp-tr1 is smaller than a predefined minimum stay period tsmin (e.g., a minimum pause interval). As a consequence, the first stay period is not used to compensate any planned stay periods for the expected arrival time computation. However, the second stay period sp-tr2 is longer than tsmin. As a consequence, this stay is perceived by the navigation system as a break which was already planned into the original route planning. Therefore, the measured second stay period will reduce the planned stay periods accordingly when the expected arrival time is updated.

Figure 5:
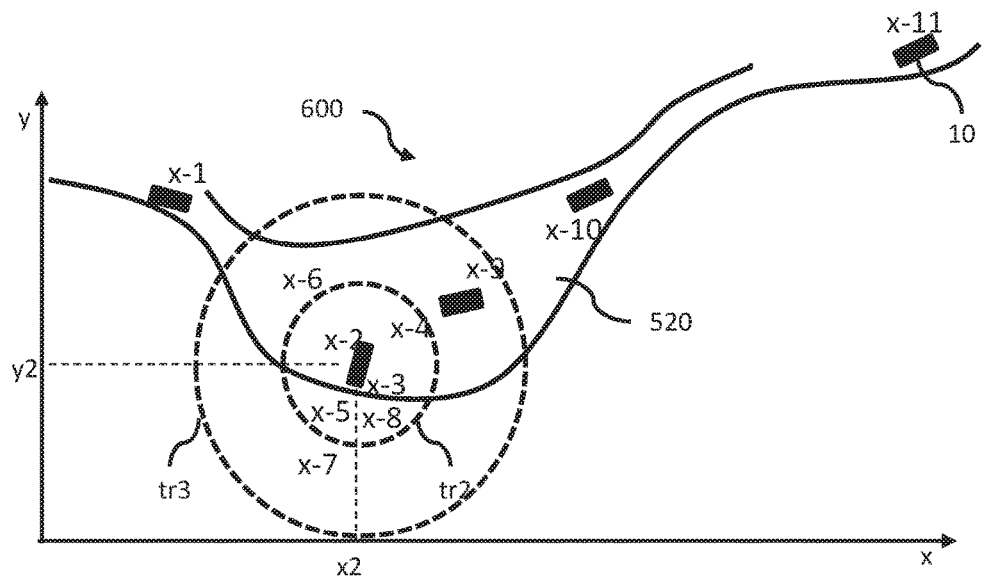
FIG. 5 is a further terrain diagram illustrating a noisy positioning signal.

FIG. 5 is a further terrain diagram 600 illustrating a noisy positioning signal. The terrain diagram 600 is a zoomed view of the terrain diagram of FIG. 3 where the parking space 520 with the second stop location (x2,y2) is in focus.

FIG. 5 illustrates the functioning of the optional filter component of the stay detection system. Upon the detection of the stop of the vehicle 10 at the second stop location (x2,y2) the location data sets received from the location sensor may show considerable noise dependent on the type and quality of the positioning signal. In case of a low quality signal (e.g., cell tower signals) location data sets are received which correspond to locations outside the tolerance range tr2 although the vehicle is still standing at the stop location. In the example of FIG. 5, the physical locations represented by the received location data sets are illustrated by an x separated by a dash from the number representing the order of receipt. x-1 corresponds to the physical location of the vehicle as it is taking the exit to the parking space 520. x-2 and x-3 correspond to the two consecutive location data sets for which the system detects a stop of the vehicle as they both represent the same physical location within the tolerance range tr2. In the example, the actual stop location (x2,y2) corresponds approximately to the averaged location of x-2 and x-3. The following location data sets x-4 and x-5 fall into the tolerance range indicating that the vehicle 10 is still staying. However, x-6 and x-7 are outside the tolerance range tr2 because of poor signal quality. In case the system determines a trend that the vehicle is moving away a restart of the vehicle would be detected erroneously. In the example this is unlikely because both locations x-6 and x-7 have approximately the same distance from the stop location. x-8 is again within tolerance range tr2. The system can filter the periodically received location data x-2 to x-8 by ignoring the location data sets x-6, x-7 received after the start t3 of the stay period sp-tr2 (cf. FIG. 4) if the location data sets x-6, x-7 represent physical locations outside the tolerance range tr2 and are followed by at least one further location data set x-8 within the tolerance range tr2. This is the case in the example scenario. That is, the false positives x-6 and x-7 are simply ignored because they are followed by the true positive x-8 indicating that the vehicle is still staying. As a consequence, false positives do not trigger a restart detection. Even if x-6 and x-7 would show a trend of moving away from the stop location the system would invalidate the restart detection as soon as it recognizes that the vehicle is still at the stop location by evaluation further location data sets. This ensures that the true stay period is measured and not interrupted by artificial restart detections based on low quality positioning signal data. In cases where the location sensor receives only one cell tower signal and a triangulation method may not be applicable, the received location data sets indicate the location of the respective cell tower. In this case, the location information remains unchanged (i.e., exactly the same location information is received during the time period where only one cell tower signal is received). Such location data sets do not carry significant information for the restart detection and, therefore, can also be filtered out by the stay detection system.

It may occur that the vehicle actually restarts and returns to the same stop location at a later point in time. To avoid an invalidation of the restart detection in this case the system can use a further tolerance range tr3 which is larger than the tolerance range tr2. For example, the further tolerance range may correspond to an average size of a parking area with a radius of the tolerance range circle tr3 around two hundred and fifty meters. Multiple consecutive location data sets x-10, x-11 outside the further tolerance range t3 indicate that the vehicle has definitely left its stop location. Even if the vehicle returns to the stop location (x2,y2) later on the detected restart condition is not invalidated. That is, the actual stay period sp-tr2 (cf. FIG. 4) is not falsified by the return. The end of the stay period is associated with the location data set x-9. x-9 is the earliest data set of location data sets x-9, x-10, x-11 outside the tolerance range t3 and showing a trend that the vehicle is moving away from the stop location.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 for stay detection of FIG. 1. Computing device 950 is intended to represent various forms of mobile devices, such as personal digital assistants, cellular telephones, smart phones, and other similar computing devices. For example, computing device 950 may include the navigation system 300 as shown in FIG. 1. The components shown here, their connections and relationships, and their functions, are meant to be exemplary only, and are not meant to limit implementations of the subject matter described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer system for detecting a stay of a vehicle, comprising:
   an interface component configured to periodically receive location data sets from one or more location sensors attached to the vehicle;
   a motion detection component configured to:
      detect a stop of the vehicle when at least two consecutive location data sets represent the same physical location within a tolerance range, thus defining a stop location of the vehicle, and to determine a point in time corresponding to the earliest received data set of the consecutive location data sets as start of a stay period; and
      detect a restart of the vehicle when at least two consecutive location data sets are outside the tolerance range of the stop location and the location data sets outside the tolerance range show a trend that the vehicle is moving away from the stop location, and to determine the point in time corresponding to the earliest received data set of the consecutive location data sets outside the tolerance range as end of the stay period;
   the motion detection component characterized in that upon the detection of a stop of the vehicle, to filter periodically received location data by ignoring particular location data sets received after the start of the stay period if, the particular location data sets represent physical locations outside the tolerance range, and the particular location data sets are followed by at least one further location data set within the tolerance range,
   wherein a restart detection is invalidated if the particular location data sets correspond to the at least two consecutive location data sets outside the tolerance range of the stop location showing a trend that the vehicle is moving away from the stop location, and are followed by at least one further location data set within the tolerance range.

2. The system of claim 1, wherein the stop location is an averaged location of the at least two consecutive location data sets representing the same physical location.

3. The system of claim 1, wherein the tolerance range is defined by a predefined geometric shape with the stop location defined at a center of gravity associated with the geometric shape.

4. The system of claim 1, wherein the motion detection component is further configured to dynamically adjust a size of the tolerance range by taking into account the quality of the positioning signal received by the location sensor.

5. The system of claim 1, further comprising a vehicle navigation system communicatively coupled with the computer system, the vehicle navigation system including:
   a route planning component configured to compute an expected arrival time of the vehicle based on a planned route, a start time and at least one planned stay period;
   an interface component configured to receive a measured actual stay period from the computer system; and
   an updating component configured to update the expected arrival time based on a current location of the vehicle, a current time, and the received actual stay period wherein updating includes charging the actual stay period up against the at least one planned stay period if the length of the actual stay period exceeds a predefined threshold length.

6. A computer-implemented method for detecting a stay of a vehicle, the method comprising:
   periodically receiving location data from one or more location sensors attached to the vehicle;
   detecting a stop of the vehicle when at least two consecutive location data sets represent the same physical location within a tolerance range, thus defining a stop location of the vehicle, and determining a point in time corresponding to the earliest received data set of the consecutive location data sets as start of a stay period; and
   detecting a restart of the vehicle when at least two consecutive location data sets are outside the tolerance range of the stop location and the location data sets outside the tolerance range show a trend that the vehicle is moving away from the stop location, and determining the point in time corresponding the earliest received data set of the consecutive location data sets outside the predefined tolerance range as end of the stay period, wherein a restart detection is invalidated if the particular location data sets correspond to the at least two consecutive location data sets outside the tolerance range of the stop location showing a trend that the vehicle is moving away from the stop location, and are followed by at least one further location data set within the tolerance range.

7. The method of claim 6, further comprising:

updating an expected arrival time in a vehicle navigation system, wherein the expected arrival time is computed based on: a planned route, at least one planned stay period, a current location of the vehicle, a current time, and the measured actual stay period, and wherein updating includes charging the measured actual stay period up against the at least one planned stay period if the length of the actual stay period exceeds a predefined threshold length.

8. The method of claim 6, further comprising:

upon detecting a stop of the vehicle, filtering the periodically received location data by ignoring particular location data sets received after the start of the stay period if:

the particular location data sets represent physical locations outside the tolerance range, and the particular location data sets are followed by at least one further location data set within the tolerance range.

9. The method of claim 6, wherein the stop location is an averaged location of the at least two consecutive location data sets representing the same physical location.

10. The method of claim 6, wherein the tolerance range is defined by a predefined geometric shape with the stop location defined at a center of gravity associated with the geometric shape.

11. The method of claim 6, wherein the size of the tolerance range is dynamically adjusted taking into account the quality of the positioning signal received by the location sensor.

12. The method of claim 6, wherein the one or more location sensors are selected from the group consisting of: a Global Positioning System (GPS) sensor, a Global Navigation Satellite System (GNSS) sensor, a Ground Based Augmentation System (GBAS) sensor, a Local Area Augmentation System (LAAS) sensor, and a Ground Based Regional Augmentation System (GRAS) sensor.

13. A stay detection computer program product having instructions that when loaded into a memory of a computing device and executed by at least one processor of the computing device executes the following steps:

periodically receiving location data from one or more location sensors attached to a vehicle;

detecting a stop of the vehicle when at least two consecutive location data sets represent the same physical location within a tolerance range, thus defining a stop location of the vehicle, and determining the point in time corresponding to an earliest received data set of the consecutive location data sets as start of a stay period; and detecting a restart of the vehicle when at least two consecutive location data sets are outside the tolerance range of the stop location and the location data sets outside the tolerance range show a trend that the vehicle is moving away from the stop location, and determining the point in time corresponding the earliest received data set of the consecutive location data sets outside the predefined tolerance range as end of the stay period, wherein a restart detection is invalidated if the particular location data sets correspond to the at least two consecutive location data sets outside the tolerance range of the stop location showing a trend that the vehicle is moving away from the stop location, and are followed by at least one further location data set within the tolerance range.

14. The computer program product of claim 13, further comprising:

updating an expected arrival time in a vehicle navigation system, wherein the expected arrival time is computed based on: a planned route, at least one planned stay period, a current location of the vehicle, a current time, and a measured actual stay period, and wherein updating includes charging the measured actual stay period up against the at least one planned stay period if the length of the actual stay period exceeds a predefined threshold length.

15. The computer program product of claim 13, further comprising:

upon detecting a stop of the vehicle, filtering the periodically received location data by ignoring particular location data sets received after the start of the stay period if:

the particular location data sets represent physical locations outside the tolerance range, and the particular location data sets are followed by at least one further location data set within the tolerance range.

16. The computer program product of claim 13, wherein the stop location is an averaged location of the at least two consecutive location data sets representing the same physical location.

17. The computer program product of claim 13, wherein the size of the tolerance range is dynamically adjusted taking into account the quality of the positioning signal received by the location sensor.

18. The computer program product of claim 13, wherein the one or more location sensors are selected from the group consisting of: a Global Positioning System (GPS) sensor, a Global Navigation Satellite System (GNSS) sensor, a Ground Based Augmentation System (GBAS) sensor, a Local Area Augmentation System (LAAS) sensor, and a Ground Based Regional Augmentation System (GRAS) sensor.

* * * * *